United States Patent [19]

Arnould et al.

[11] Patent Number: 4,471,291

[45] Date of Patent: Sep. 11, 1984

[54] STABILIZED DEVICE FOR CONSTANT-PERIOD ALL-OR-NONE REGULATION AND ELECTRIC SUPPLY SYSTEM INCORPORATING SAID DEVICE

[75] Inventors: Guy Arnould; Alain Chartier, both of Paris, France

[73] Assignee: Compagnie d'Informatique Militaire Spatiale et Aeronautique, Paris, France

[21] Appl. No.: 387,236

[22] Filed: Jun. 10, 1982

[30] Foreign Application Priority Data

Jun. 16, 1981 [FR] France ................................. 81 11839

[51] Int. Cl.³ .............................................. G05F 1/56
[52] U.S. Cl. ...................................... 323/288; 363/21
[58] Field of Search ................ 307/106; 323/282, 288; 353/20, 21

[56] References Cited

U.S. PATENT DOCUMENTS

| 3,319,151 | 5/1967 | Kanngiesser | 307/106 X |
| 3,323,037 | 5/1967 | Doss | 323/288 X |
| 3,818,306 | 6/1974 | Siemens | 363/15 |
| 4,028,606 | 6/1977 | Beuchee et al. | 363/20 |
| 4,032,830 | 6/1977 | Burroughs | 363/25 |
| 4,228,493 | 10/1980 | de Sartre et al. | 363/21 X |
| 4,276,586 | 6/1981 | Boekhorst | 363/21 |

FOREIGN PATENT DOCUMENTS

| 2445034 | 1/1976 | Fed. Rep. of Germany . |
| 2429566 | 2/1976 | Fed. Rep. of Germany . |
| 2621763 | 11/1977 | Fed. Rep. of Germany . |
| 2387474 | 10/1978 | France . |

Primary Examiner—William M. Shoop
Attorney, Agent, or Firm—Roland Plottel

[57] ABSTRACT

The mean value of a continuous function controlled by a constant-period all-or-none signal is regulated and stabilized by controlling the maximum value of the continuous function in dependence on a sawtooth signal having a variable period, each leading edge of the sawtooth signal being in synchronism with the peaks of the regulated signal.

8 Claims, 6 Drawing Figures

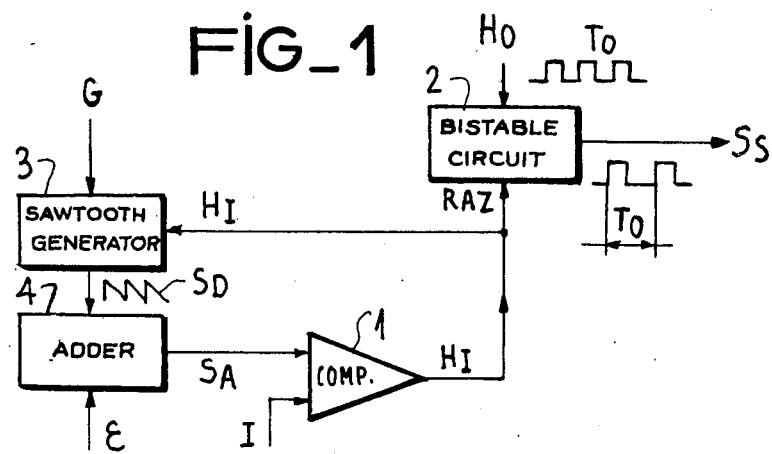
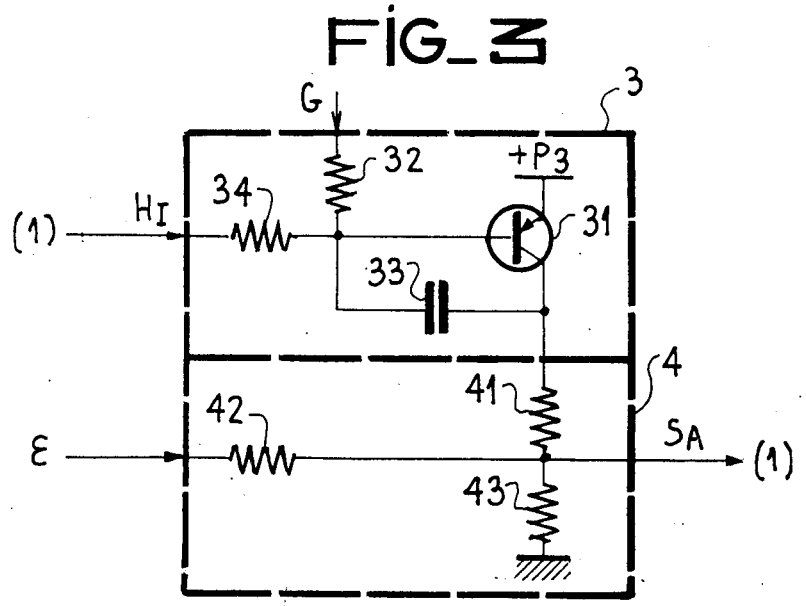
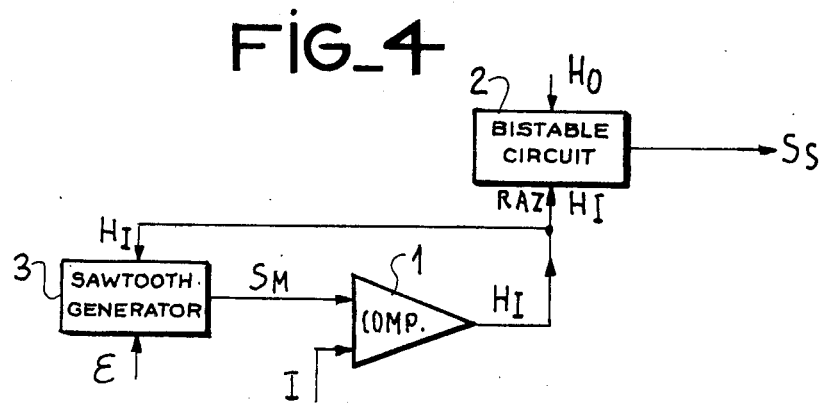

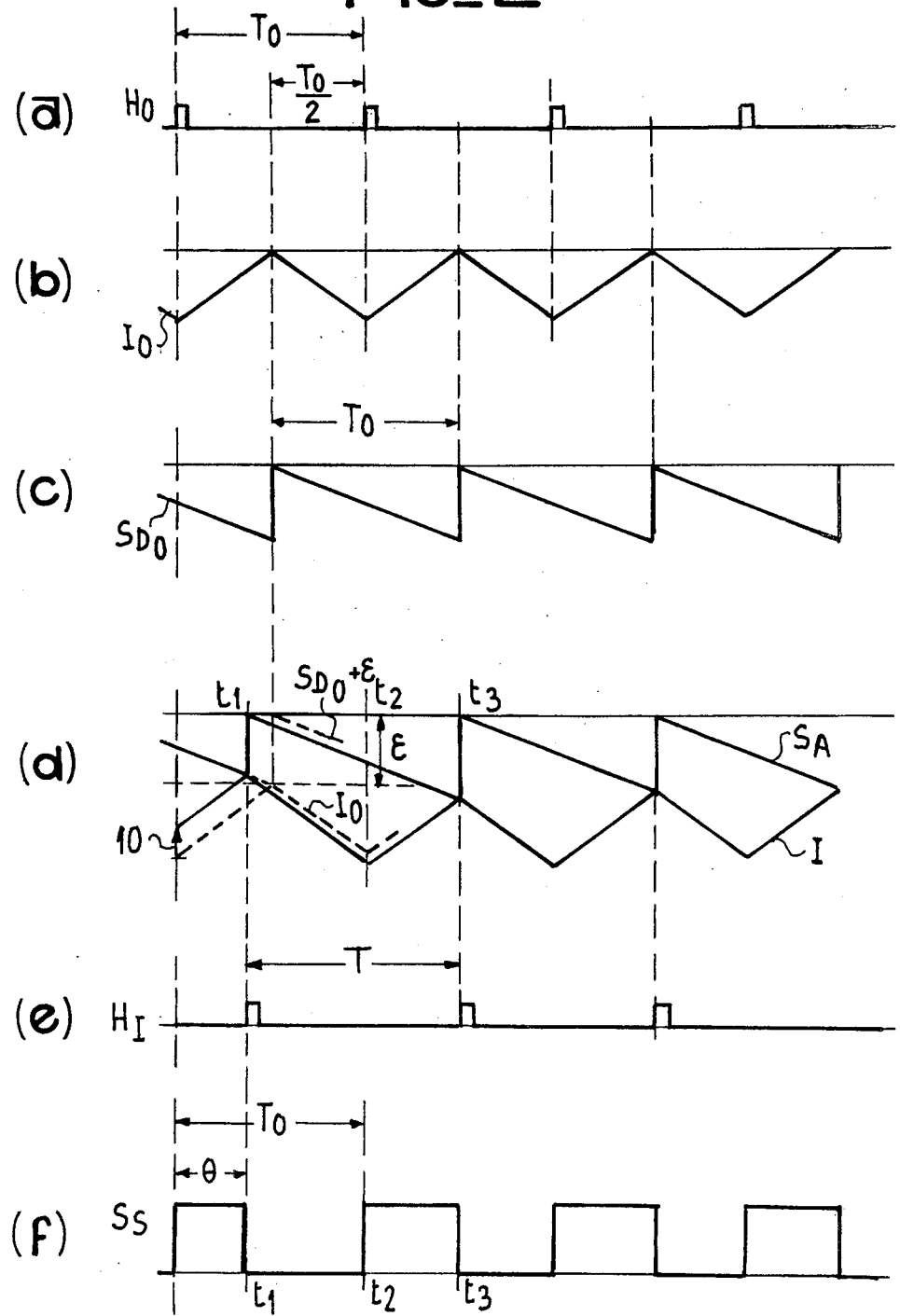

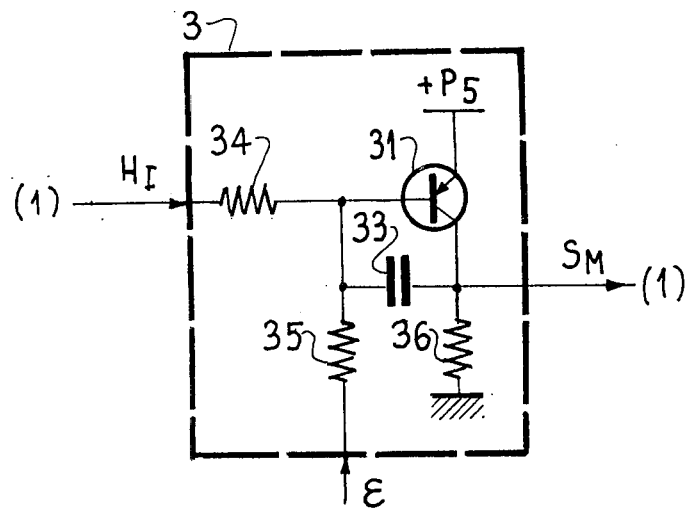
FIG_5
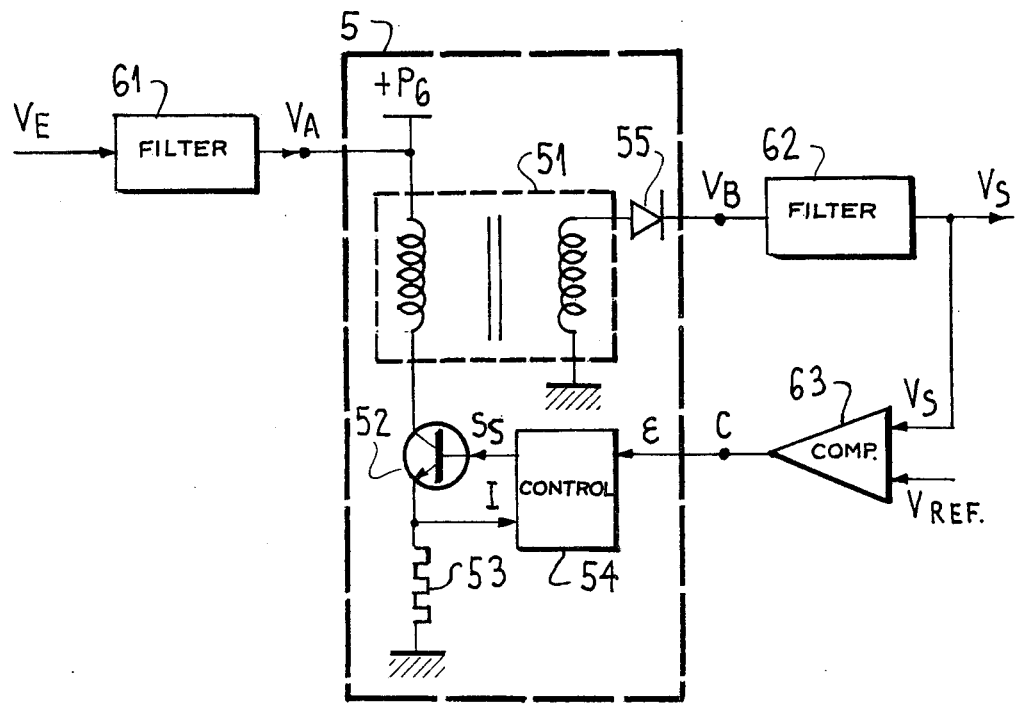
FIG_6

STABILIZED DEVICE FOR CONSTANT-PERIOD ALL-OR-NONE REGULATION AND ELECTRIC SUPPLY SYSTEM INCORPORATING SAID DEVICE

This invention relates to a device for stabilized all-or-none regulation with a constant period and more specifically for stabilized regulation of a continuous function under the control of an all-or-none signal having a constant period. A device of this type is applicable in particular to an electric supply system.

It is already known that a continuous function varies about a mean value according to the state of the control element (valve, switch, and so on) and the regulation consists in controlling the maximum value of this function so as to correspond to a given value which is usually substantially constant and designated as a reference value. Problems are encountered, however, in regard to stability of correspondence control or regulation.

Moreover, in some electric supply systems in which the output voltage is regulated, consideration has to be given to different requirements such as the desired power output as well as overall size and cost resulting in the need for modularity and parallel connection of certain modules as described, for example, in French patent application No. 79-31489 in the name of CIMSA, thereby giving rise to difficulties in regard to regulation of said output voltage.

The object of the present invention is to provide a regulating device which is both stable and adapted to parallel connection of modules constituting a supply system.

To this end, correspondence control or regulation of the mean value of a signal is carried out by making the peak value of said signal dependent, not on a continuous reference value, but on a sawtooth signal having a variable period, each leading edge of said sawtooth being triggered by the peaks of the regulated signal.

In more precise terms, the invention relates to a device comprising:
- means for generating a sawtooth signal having a variable period;
- a comparator for comparing the signal to be regulated with the sawtooth signal and for delivering a signal consisting of a series of pulses corresponding to the instants at which the value of the signal to be regulated attains the value of the sawtooth signal, said pulses being delivered to the sawtooth-signal generating means for determining the period of said sawtooth signal;
- a bistable circuit for receiving a constant-period signal as well as the preceding pulses and for delivering a control signal which produces action on the signal to be regulated and has the same constant period, said control signal being in the form of square waves whose timeduration is determined by said pulses.

Other features of the invention will be more apparent upon consideration of the following description and accompanying drawings, wherein:

- FIG. 1 shows a first embodiment of the regulating device according to the invention;
- FIG. 2 (a) to (f) represents diagrams of signals which may be present at different points of the device shown in the previous figure;
- FIG. 3 shows a constructional detail of the device shown in FIG. 1;
- FIG. 4 shows a second embodiment of the regulating device according to the invention;
- FIG. 5 shows a constructional detail of the device shown in the previous figure;
- FIG. 6 shows one embodiment of the supply system according to the invention.

In these different figures, the same references relate to the same elements.

In FIG. 1, there is shown a comparator 1 for receiving on the one hand a signal I to be regulated and on the other hand a control signal $S_A$; the comparator 1 delivers a signal $H_I$ consisting of a series of pulses corresponding to the instants at which the value of the signal I attains the value of the signal $S_A$. The signal $H_1$ is directed on the one hand to a bistable circuit 2 and on the other hand to a sawtooth generator 3. The bistable circuit 2 receives on the one hand a clock signal $H_o$ having a period $T_o$ and on the other hand the signal $H_I$ which resets (input RAZ the bistable circuit to zero. Said circuit delivers at the output a signal $S_s$ which serves to control the signal I to be regulated and is a square-wave signal having a pseudo period $T_o$, the time-duration ($\theta$) of the square waves being determined by the signal $H_I$.

The sawtooth generator 3 produces a signal $S_D$ which is a sawtooth signal having a constant slope but a period which is determined by the signal $H_I$. Each pulse constituting the signal $H_I$ triggers the leading edge of one sawtooth. Said generator 3 can be constructed for example by means of an integrator which receives a constant physical quantity G such as current or voltage and integrates said quantity between two pulses of the signal $H_I$. An arrangement of this type is described with reference to FIG. 3.

In the embodiment shown in the figure, the sawtooth signal $S_D$ is not compared directly with the signal I to be regulated but a constant quantity which is a reference signal bearing the notation $\epsilon$ is added (adder 4) to said sawtooth signal in order to form the signal $S_A$. It should be noted that the signal $\epsilon$ is not necessary and further not necessarily constant.

The operation of the device shown in FIG. 1 is explained with the aid of diagrams a to f of FIG. 2 representing the time-dependent variation of different signals which may be present at different points of said device.

The first diagram (2a) represents the clock signal $H_o$ which provides periodic pulses in the form of square waves (period $T_o$). In the field of application hereunder described, which consists in regulating a continuous quantity controlled by an all-or-none signal having a constant period, $T_o$ designates this constant period. The all-or-none control signal (not shown) is a square-wave signal having a period $T_o$, the time-duration of the square waves being $T_o/2$, for example.

Diagram 2b represents by way of example a signal to be regulated such as a current I, which varies about a mean value according to the state of the control signal described in the foregoing, said signal to be regulated being designated as $I_o$ in the absence of disturbances. In this case, said signal has a period $T_o$ with a constant slope which is alternately positive and negative, one pulse of the signal $H_o$ being synchronized with each rise of the signal $I_o$. It is apparent that the peak value of this signal is constant.

Diagram 2c represents the sawtooth signal produced by the generator 3 and designated as $S_{Do}$, again in the absence of disturbances. This signal has the same period $T_o$ as the signal I and a constant slope, the leading edges of which are synchronized with the peak values of the signal I and therefore phase-shifted (in phase opposition in the example shown in the diagram) with respect to the signal $H_o$.

Diagram 2d represents a correspondence control of the peak value of a disturbed signal I by means of the signal $S_A$. In this diagram, the dashed lines show the beginning of the undisturbed signal $I_o$ and the signal I which differs from said signal $I_o$ as a result of a disturbance is represented by an arrow 10. The signal $S_A$ is formed by the signal $S_{Do}$ to which the value $\epsilon$ has been added. As stated above, the peak value of the signal I is controlled in dependence on the signal $S_A$. In other words, when the peak of the signal I attains the value of the signal $S_A$ (instant $t_1$ in the figure), the slope of the signal I changes direction until the following time marker pulse of the clock $H_o$ (instant $t_2$). When the signal I changes direction ($t_1$), the signal $S_A$ reverts at the same time to its peak value as shown in the figure and is then distinguished from the preceding signal $S_{Do}(\epsilon)$ in the absence of disturbances. At this instant $t_1$, the comparator 1 of FIG. 1 delivers a pulse as shown in diagram 2e which represents the signal $H_1$ and it is this pulse which is applied to the sawtooth generator 3 and permits a rise of the signal $S_A$ to its peak value. For enhanced simplicity, the change of slope of the signal I, the generation of the pulse of the signal $H_I$ and the rise of the signal $S_H$ are shown at the same instant $t_1$. In practice, it is clear that the rise of the signal $S_D$ is slightly displaced with respect to the instant $t_1$ but this phenomenon does not have any appreciable influence on the result and is therefore not taken into account in the following description. After the instant $t_1$, the signal $S_A$ decreases until an instant $t_3$ which is subsequent to the instant $t_2$. At this instant, the signal I is again equal to the signal $S_A$: at this moment, the effects are the same as at the instant $t_1$ and a pulse $H_I$ is produced. It is apparent that the "period" of the signals $S_A$ or $H_I$ which is designated as T is not constant but varies in the vicinity of $T_o$.

Diagram 2f represents the output signal $S_s$ of the device, which is a square-wave signal having a pseudo period $T_o$, this latter being given by the signal $H_o$, and the time-duration $\theta$ of the square waves is provided by the signal $H_I$ which resets the bistable circuit 2 to zero.

The device described with reference to FIGS. 1 and 2 therefore serves to deliver a signal $S_s$ constituting the control signal for the continuous function I to be regulated. This signal $S_s$ is a pseudo-periodic all-or-none signal having a constant period ($T_o$) of given amplitude, the only variable quantity of which is its form factor $\theta/T$.

FIG. 3 represents a form of construction of the sawtooth generator 3 and of the summing device 4 of FIG. 1.

The generator 3 is an integrator for a physical quantity G which can be a current, for example. Said generator comprises a pnp-type bipolar transistor 31, the emitter of which is connected to a bias potential $+P_3$, the quantity G being applied to the base of said transistor through a resistor 32. The signal $H_I$ emanating from the comparator 1 is delivered via a resistor 34 to the base of the transistor 31. The collector of said transistor is connected to its base through a capacitor 33. The collector constitutes the output connection of the integrator 3.

The summing device 4 is formed by three resistors 41, 42, 43 having a common point which constitutes the output point of the signal $S_A$ which is intended to be applied to the comparator 1. The output signal of the integrator 3 is applied to the other terminal of the resistor 41, the signal $\epsilon$ is applied to the other terminal of the resistor 42 and the other terminal of the resistor 43 is connected to ground.

FIG. 4 illustrates a second embodiment of the device according to the invention in which there are again shown the comparator 1, the bistable circuit 2 and the sawtooth generator 3 which are connected in accordance with the arrangement shown in FIG. 1. The difference between the two figures lies in the fact that the signal $\epsilon$ is not added to the sawtooth signal $S_D$ but modulates the slope of the sawtooth. This modulated signal designated by the reference $S_M$ is applied to the comparator 1 instead of the signal $S_A$. Otherwise the operation of the device is identical with that of FIG. 1.

FIG. 5 illustrates a constructional detail of the circuit 3 in the case of FIG. 4.

There is again shown the transistor 31, the signal $\epsilon$ being now applied to the base of said transistor via a resistor 35 whilst the signal $H_I$ is also applied to the base of said transistor via a resistor 34 as before and a capacitor 33 connects the base to the collector of said transistor 31. Furthermore, said collector is connected to ground via a resistor 36 and constitutes the output connection of the device 3 which delivers the signal $S_M$.

FIG. 6 illustrates an embodiment of an electric supply system according to the invention. In either of its embodiments, said system incorporates a regulating device as described in the foregoing.

In accordance with well-known practice, an electric supply of an electronic system constitutes the interface between a source of energy such as a power supply network which delivers direct-current or alternating-current voltage having variable characteristics and an electronic system which makes use of direct-current voltages, the values of which can be highly variable according to the systems as well as total power outputs required.

There is shown in FIG. 6 a filtering device 61 which receives the voltage $V_E$ delivered by the power supply network and has the function of isolating the input voltage by filtering a certain number of parasitic signals, especially transient signals.

The volta $V_A$ derived from the filter 61 is supplied to a converter unit 5 whose function is to convert the volta $V_A$ to a signal $V_B$ which has the characteristics required by the utilization electronic system after filtering in a filter 62, this output signal being designated by the reference $V_s$.

The converter 5 comprises the aforementioned regulating device which is designated by the reference numeral 54 and to which the signal $\epsilon$ is applied after sampling the output voltage $V_S$ and comparing this latter with a reference voltage $V_{REF}$ in a comparator 63. The converter 5 further comprises a transformer 51, the primary winding of which is connected to a bias voltage $+P_6$ and receives the signal $V_A$ whilst the secondary winding of said transformer delivers the signal $V_B$ via a diode 55. The other end of the secondary winding is connected to ground. The other end of the primary winding of the transformer 51 is connected to the collector of an npn-type bipolar transistor 52, the emitter of which is connected to ground through a resistor 53. The base of the transistor 52 receives the signal $S_s$ delivered by the device 54; the signal I is delivered to the device 54 via the emitter of the transistor 52.

It is thus apparent that a double correspondence control both in voltage and in current is achieved in this supply system. Voltage control is performed at the level of the comparator 63, the signal ε being produced by comparison of the output voltage with a reference voltage. Current control is achieved as described in detail in the foregoing by means of an all-or-none regulated control signal ($S_s$) having a constant pseudo-period ($t_o$) which is applied to the base of the transistor 52, the current thus regulated being the current which is present on the emitter of said transistor 52, representing the current in the primary winding.

The device illustrated in FIG. 6 has a further advantage in that it readily permits an arrangement of a plurality of converter modules such as the module 5 in parallel as described, for example, in the French patent Application cited earlier. Indeed it is a known fact that, whenever it is desired to increase the power supply, the design of filters gives rise to difficulties in regard to power consumption as well as to the overall size or volume of filters. Thus it often proves to be a greater advantage to connect a plurality of converter modules in parallel, which is possible in this case at the points A, B and C at which the signals $V_A$, $V_B$ and ε are present respectively.

What is claimed is :

1. A stabilized device for constant-period all-or-none regulation of a signal, wherein said device comprises :
   - means for generating a sawtooth signal having a variable period ;
   - a comparator for comparing the signal to be regulated with the sawtooth signal and for delivering a series of pulses corresponding to the instants at which the value of the signal to be regulated attains the value of the sawtooth signal, said pulses being delivered to the sawtooth-signal generating means for determining the period of said sawtooth signal ;
   - a bistable circuit for receiving a constant-period signal as well as the preceding pulses and for delivering a control signal which produces action on the signal to be regulated and has the same constant period, said control signal being in the form of square waves whose timeduration is determined by said pulses.

2. A device according to claim 1, wherein the means for generating a sawtooth signal comprise an integrator.

3. A device according to claim 1, wherein said device further comprises means for adding a reference signal to the sawtooth signal, the resultant signal being applied to the comparator.

4. A device according to claim 2, wherein the integrator receives a constant signal which it integrates between instants defined by the signal which consists of a series of pulses.

5. A device according to claim 2, wherein the integrator receives a reference signal which it integrates between instants defined by the signal consisting of a series of pulses.

6. An electric supply system, wherein said system comprises a regulating device according to claim 1.

7. A supply system according to claim 6 and connected to a source of energy in order to deliver a regulated output voltage, wherein said system comprises a converter module connected to the energy source and comprising a transformer whose primary winding is connected to a transistor controlled by the regulating device, the output voltage being delivered by the secondary winding of said transformer, a signal representing the current which flows within the primary winding being applied to the regulating device.

8. A supply system according to claim 7, wherein the regulating device also receives a signal constituting a reference signal obtained by comparison of the output voltage with a reference value.

* * * * *